(12) United States Patent
Boss et al.

(10) Patent No.: US 6,214,064 B1
(45) Date of Patent: Apr. 10, 2001

(54) PROCESS FOR MAKING A FUEL PRODUCT FROM COAL FINES AND SEWAGE SLUDGE

(76) Inventors: Edward E. Boss, 13700 Veterans Memorial Dr., Suite 380, Houston, TX (US) 77014; Samuel L. Shepherd, 5211 Mulberry Grove, Kingwood, TX (US) 77345

(*) Notice: Subject to any disclaimer, the term of this patent is extended or adjusted under 35 U.S.C. 154(b) by 0 days.

(21) Appl. No.: 09/499,325

(22) Filed: Feb. 7, 2000

Related U.S. Application Data

(63) Continuation-in-part of application No. 09/092,579, filed on Jun. 5, 1998, now Pat. No. 6,056,880, which is a continuation-in-part of application No. 08/910,849, filed on Aug. 13, 1997, now Pat. No. 5,868,942.

(51) Int. Cl.[7] ........................................... C10L 5/00
(52) U.S. Cl. .................. 44/593; 44/594; 44/596; 44/599; 44/620
(58) Field of Search ............................ 44/593, 594, 596, 44/599, 620; 210/750, 752, 764, 766, 695

(56) References Cited

U.S. PATENT DOCUMENTS

| | | | |
|---|---|---|---|
| 3,966,427 | * | 6/1976 | Herment et al. . |
| 4,038,180 | * | 7/1977 | Talbert .................................. 210/609 |
| 4,169,711 | * | 10/1979 | Anderson . |
| 4,306,978 | * | 12/1981 | Wurtz .................................... 210/750 |
| 4,500,428 | * | 2/1985 | Lynch et al. ........................... 210/774 |
| 4,586,936 | * | 5/1986 | Schaffer et al. . |
| 4,618,347 | * | 10/1986 | Watt et al. . |
| 4,738,685 | * | 4/1988 | Goleczka et al. . |
| 4,762,527 | * | 8/1988 | Beshore et al. ......................... 44/605 |
| 4,781,842 | * | 11/1988 | Nicholson ............................. 210/751 |
| 4,863,485 | * | 9/1989 | Schaffer et al. . |
| 4,902,431 | * | 2/1990 | Nicholson ............................. 210/751 |
| 5,009,671 | * | 4/1991 | Franke .................................... 44/560 |
| 5,089,540 | * | 2/1992 | Armbruster .......................... 523/213 |
| 5,188,741 | * | 2/1993 | Zang et al. ............................... 71/12 |
| 5,196,043 | * | 3/1993 | Wurtz ...................................... 71/12 |
| 5,244,473 | * | 9/1993 | Sardessai et al. ....................... 44/553 |
| 5,482,528 | * | 1/1996 | Angell et al. ......................... 210/609 |
| 5,599,361 | * | 2/1997 | Ford, Jr. .................................. 44/553 |
| 5,635,069 | * | 6/1997 | Boss et al. ............................... 422/38 |
| 5,743,924 | * | 4/1998 | Dospoy et al. .......................... 44/55 |
| 5,868,942 | * | 2/1999 | Boss et al. ............................ 210/695 |
| 5,888,453 | * | 3/1999 | Luker .................................... 210/723 |
| 5,916,448 | * | 6/1999 | Fergen ................................. 210/750 |
| 5,916,826 | | 6/1999 | White . |
| 6,056,880 | * | 5/2000 | Boss et al. ............................ 210/695 |

* cited by examiner

Primary Examiner—Margaret Medley
(74) Attorney, Agent, or Firm—Harrison & Egbert

(57) ABSTRACT

A process for making a fuel product including blending a sewage sludge with an acid, mixing an oxide-containing chemical with the blended sludge so as to cause a reaction which elevates a temperature of the sludge, pressurizing the mixed sludge to a pressure of greater than 14.7 p.s.i.a. for a period of time of no less than 15 seconds, mixing the pressurized mixed sludge with coal fines, and solidifying the mixture of pressurized mixed sludge and coal fines. The oxide-containing chemical is either calcium oxide or calcium hydroxide. The acid is sulfamic acid. The step of solidifying includes pelletizing the mixture. The solidified mixture has a BTU content of greater than 5000 BTU per pound.

14 Claims, 1 Drawing Sheet

PROCESS FOR MAKING A FUEL PRODUCT FROM COAL FINES AND SEWAGE SLUDGE

RELATED APPLICATIONS

The present application is a continuation-in-part of U.S. patent application Ser. No. 09/092,579, filed on Jun. 5, 1998, and entitled "Process for Treating a Waste Sludge of Biological Solids", presently now U.S. Pat. 06/056,880. U.S. patent application Ser. No. 09/092,579 which was a continuation-in-part of U.S. patent application Ser. No. 08/910,849, filed on Aug. 13, 1997, and entitled "Process for Treating a Waste Sludge of Biological Solids". This patent issued as U.S. Pat. No. 5,868,942 on Feb. 9, 1999.

TECHNICAL FIELD

The present invention relates to processes for the treatment of waste sludges. More particularly, the present invention relates to processes for making a fuel product from the end product of the process for treatment of waste sludges. The present invention relates to the reclamation of coal fines by the addition of such coal fines to the treated waste sludge. Additionally, the present invention relates to processes that render biological waste pathogen-free, vector-free and sellable.

BACKGROUND ART

In the past, various techniques have been developed for the purpose of sterilizing or decontaminating biological sludges and wastes. The most common process is the process of mixing lime with the sludge. The reaction of lime with the water in the sludge serves to elevate the temperature of the sludge to a maximum of 100° C.

In the past, various U.S. patents have issued relating to processes for the decontamination and treatment of wastewater sludges. For example, U.S. Pat. No. 4,038,180, issued on Jul. 26, 1977 to N. K. Talbert, describes a process of dewatering sewage sludge in which the sludge from a municipal or industrial sewage treatment facility is mixed with a mineral acid or anhydride thereof to release the entrapped water in the sludge. The resulting mixture of the sludge solids and diluted acid or anhydride is then mixed with a basic material, such as ammonia, such that the heat generated by the reaction of the base and the acid evaporates the water to form either a completely dry mixture of sludge solids and a salt or a mixture having a predetermined moisture content which may be air dried.

U.S. Pat. No. 4,500,428, issued on Feb. 19, 1985 to Lynch et al., describes a method for the treatment of a wastewater sludge using a pair of reaction vessels, sequentially, to treat the sludge. Both of the vessels are pressurized. The first vessel has an aerator for aerating the sludge. This vessel receives sulfuric acid and chlorine therein through a port. A dewatering device is provided upstream of the first vessel. The outlet of the first vessel is coupled to an inlet of the second vessel through another dewatering device. The second vessel creates a final treatment chamber in which the sludge is exposed to ozone, air and lime.

U.S. Pat. Nos. 4,781,842 and 4,902,431, issued to Nicholson, teach processes for the decontaminating of wastewater sludges to a level which meets or exceeds U.S. E.P.A. process standards. The process mixes sludge with an alkaline material sufficient to raise the pH of the end product to 12 or higher for at least one day. This process will raise the temperature to 50° C., but will not sterilize the sludge nor does it eliminate the pathogenic organisms.

U.S. Pat. No. 4,306,978, issued to Wurtz, relates to a process of lime stabilization of wastewater treatment plant sludge. This patent discloses the dewatering of the sludge and intimately mixing calcium oxide to raise the temperature so as to produce a stabilized sludge particle.

U.S. Pat. No. 5,482,528, issued on Jan. 9, 1996 to Angell et al., teaches a pathogenic waste treatment process for the processing of solid waste and for the converting of such solid waste into useful products. This is accomplished by combining the waste with an acid, such as concentrated sulfuric acid, and a base, such as fly ash. These exothermically react and thermally pasteurize the waste and add mineral value to the product. Pozzolanic materials, such as fly ash, agglomerate the product. The calcium oxide in the fly ash reacts with sulfuric acid to form calcium sulfate dihydrate.

None of these prior art patented processes are capable of achieving temperatures, when mixed with the sludge, of greater than 100° C. None of the prior art techniques allow for the shorter drying times as required by 40 C.F.R. Subchapter O, Part 503.32.

U.S. Pat. No. 5,635,069 issued on Jun. 3, 1997 to the present inventors. This patent described a process for treating a waste sludge of biological solids which included the steps of mixing the sludge with an oxide-containing chemical and sulfamic acid so as to elevate the temperature of the sludge, pressurizing the mixed sludge to a pressure of greater than 14.7 p.s.i.a., and discharging the pressurized mixed sludge. The oxide-containing chemical could be either calcium oxide, potassium oxide, or potassium hydroxide. The sludge has a water content of between 5 and 85 percent. The oxide-containing chemical and the acid are reacted with the sludge so as to elevate the temperature of the sludge to between 50° C. and 450° C. The pressurized mixed sludge is flashed across a restricting orifice or passed into a chamber having a lower pressure. The evaporated liquid component can be condensed and used as part of the process or external of the process.

In coal mining processing and handling, enormous tonnages of coal fines are created. Typically, after handling and cleaning are completed, about 15 to 20% of the tonnage mined consists of fines ranging in size from powder to small granules. For the most part, these fines are not directly usable, thereby leaving great quantities of material that is wasted and representing a hazardous and expensive disposal problem. While a portion of the coal fines can be combined with coarser fractions of mine production for sale, the inclusion of all fines often reduces the quality of the product below market requirements. Accordingly, coal fines handling, storage and disposal operations represent a significant and unproductive expense for the industry.

The fines material from mining operations is frequently in the form of a wet filter cake containing between about 20 and 30% moisture, depending upon its size distribution and ash content. In a dry state, the fines are generally predominantly passable through a 28-mesh screen, a size that may be used for pelletizing and/or briquetting purposes. As used in this disclosure, the terms "pellet", "briquet", "log" and "block" are used interchangeably and are intended to refer to all forms of pellets, briquets, logs, blocks and other coal agglomerates produced by binding coal fines into a concrete material. Similarly, the terms "pelletizing" and "briquetting" are intended to refer to equivalent processes for producing coal agglomerates that are also used interchangeably.

In the past, numerous processes have been proposed and implemented for pelletizing and/or briquetting coal fines.

For example, U.S. Pat. No. 444,994, issued over a century ago, teaches that coal dust can be pelletized by saturating it with a saturation of starch, pressing or otherwise forming it into blocks or lumps and drying it in the sun or by other suitable means. U.S. Pat. No. 852,025 discloses preparing coal for briquetting by drying and heating it, mixing in an asphaltic binder material, then heating, cooling and compacting the mixture. U.S. Pat. No. 1,121,325 discloses briquetting coal fines by mixing dry coal and starch, adding steam that is saturated with oil, then compressing and thermally drying the mixture. U.S. Pat. No. 1,851,689 discloses briquetting coal fines by mixing the coals with a starch/oil emulsion and then autoclaving it at 300° F. U.S. Pat. No. 4,049,392 discloses an extrusion apparatus for extruding rod-like bodies from coal-containing particulate mixtures, and having means for adjusting the length and density of the extruded particles.

Many natural and synthetic polymers have been used as binders for coal fines. U.S. Pat. No. 5,244,473 teaches that a binder for coal fines can be made from a phenol-aldehyde resin mixed with a polyisocyanite in the presence of a catalyst. U.S. Pat. No. 5,089,540 teaches that a binder for foundry molds can be an ester-cured alkaline phenolic resin which can be enhanced by conditioning the retained sand with a solution containing an amine and a silane. U.S. Pat. No. 5,009,671 teaches that coal briquets can be made by using a starch binder mixed with molasses and water. U.S. Pat. No. 4,862,485 teaches how to make coal pellets by mixing coal particles with polyvinyl alcohol, calcium oxide, and/or magnesium oxide and water. U.S. Pat. No. 4,738,685 teaches how to cold press coal fines with molasses, an inorganic hardening agent such as calcium carbonate, calcium phosphate, iron oxide, aluminum oxide and optionally with an acid. U.S. Pat. No. 4,618,347 teaches how to make coal pellets from coal fines and a binder consisting of lignosulfanate plus sodium dichromate, or using sulfuric acid as a curing agent. U.S. Pat. No. 4,586,936 shows how to make coal pellets from lower rank coal mixed with cationic polyurethane and polyvinyl alcohol. U.S. Pat. No. 4,169,711 teaches that coal particles mixed with coal fines can be briquetted into "smokeless" fuel logs when mixed with sodium silicate and potassium silicate. Finally, U.S. Pat. No. 3,966,427 teaches how to make coal briquets using bitumen or bitumen emulsions as binders.

Many prior art binders use water in the process of mxing with coal fines to produce briquets, thereby further increasing the moisture content of the product. Thus, for example, when starch-based binders are used, the resulting green pellets must be dried to achieve acceptable fuel performance and reduced transportation costs. In addition, prior art binders are derived from useful and often expensive raw materials, such as natural and synthetic polymers; therefore, they add significantly to the overall cost of the briquet.

Recently, various U.S. patents have issued on processes for improving the abililty to utilize such coal fines. U.S. Pat. No. 5,916,826, issued on Jun. 29, 1999, to D. H. White, describes a coal agglomerate produced by the combination of coal fines with a binder material obtained from the direct liquefaction of biomass material. The direct liquefaction is carried out in the absence of oxygen at temperatures of between 450° F. and 700° F. and typical pressures between 200 and 3,000 p.s.i. The liquified bio-binder base is mixed with additives such as fast pyrolysis tars and petroleum asphalt and the resulting mixture is sprayed on coal fines preheated to at least 250° F. and allowed to react at between 300° F. and 400° F. The resulting mixed mass is then pelletized by the application of pressure in conventional equipment.

U.S. Pat. No. 5,743,924, issued on Apr. 28, 1998, to Dospoy et al., describes a pelletized fuel composition comprising coal fines in an amount of between 60 and 80% by weight, paper making sludge in an amount of between 10 to 30% by weight and a shredded polymeric material in an amount of between 0.5% to 15% by weight. The pelletized coal fines have the necessary degree of hardness and structural integrity without the necessity of a binder.

U.S. Pat. No. 5,599,361, issued on Feb. 4, 1997, to G. W. Ford, Jr., teaches a method for forming a solid fuel product comprising carbon fines bound together chemically. In particular, methyl ethyl ketone into which styrene polymer resin is dissolved is added to the wet coal fines. A polyvinyl acetate and water emulsion is added to the coal fines. The resulting mixtures are pressed into briquets using an injection pressure of 3,000 p.s.i.

In each of the aforementioned processes, the addition of chemicals, binders and cementing agents adds to the cost of producing the resulting pellet or briquet. As such, the cost of forming such briquets is at such a level that the briquets are not actually used as a fuel product.

It was found that the end product of the BIOSET (TM) process (identified in U.S. Pat. No. 5,635,069 to the present inventors) included lime, silicates and aluminum. As such, this treated sewage sludge can serve as a cement binder. Calcium hydroxide (lime), alum (clay) and sand will create a pozzolanic reaction. As such, the sewage sludge resulting from the BIOSET (TM) process can be mixed with the coal fines so as to produce a high BTU fuel product. Since the treated sewage sludge of the BIOSET (TM) process is pathogen-free and vector-free, it can be used in commercial processes. Furthermore, the organic material within the treated sewage sludge adds to the BTU content (approximately 1200 BTU per pound).

It is an object of the present invention to provide a process which makes valuable use of coal fines.

It is another object of the present invention to provide a process which produces a high BTU fuel product.

It is a further object of the present invention to provide a process which utilizes treated sewage sludge to bind coal fines together.

It is a further object of the present invention to provide a fuel product which qualifies for the alternative fuel tax credit.

It is still another object of the present invention to provide a process which renders sewage sludge vector-free, pathogen-free and sellable.

It is still another object of the present invention to provide a process whereby coal fines can be made easily transportable.

These and other objects and advantages of the present invention will become apparent from a reading of the attached specification and appended claims.

SUMMARY OF THE INVENTION

The present invention is a process for making a fuel product comprising the steps of: (1) blending a sewage sludge with an acid; (2) mixing an oxide-containing chemical with the blended sludge so as to cause a reaction which elevates the temperature of the sludge; (3) pressurizing the mixed sludge to a pressure of greater than 14.7 p.s.i.a. for a period of time of no less than 15 seconds; (4) mixing the pressurized mixed sludge with coal fines; and (5) solidifying a mixture of pressurized mixed sludge and coal fines.

In the process of the present invention, the sewage sludge will have a solids content of greater than 7% by weight. The oxide-containing chemical is calcium hydroxide. The pressurized mixed sludge will have a calcium hydroxide content of between 20 and 60% inclusive by dry weight. The pressurized mixed sludge has a sand or silicate content of between 1 and 20% by weight. The solidified mixture is between 40 and 95% by weight of coal fines.

In the process of the present invention, the step of solidifying includes pelletizing the mixture of pressurized mixed sludge and coal fines. The process of the present invention further initially includes the step of dewatering the sludge prior to the step of blending. This step of dewatering causes the sludge to have a water content of less than 93%. The step of pressurizing includes passing the mixed sludge as a flow through a pipe. The pipe serves to maintain the mixed sludge at the pressure of greater than 14.7 p.s.i.a. The pipe has a length such that the flow of the mixed sludge takes longer than 15 seconds to pass through the pipe.

In the process of the present invention, the solidified mixture of the sewage sludge and coal fines will have a BTU content of greater than 5,000 BTU per pound.

DETAILED DESCRIPTION OF THE INVENTION

Figure 1:
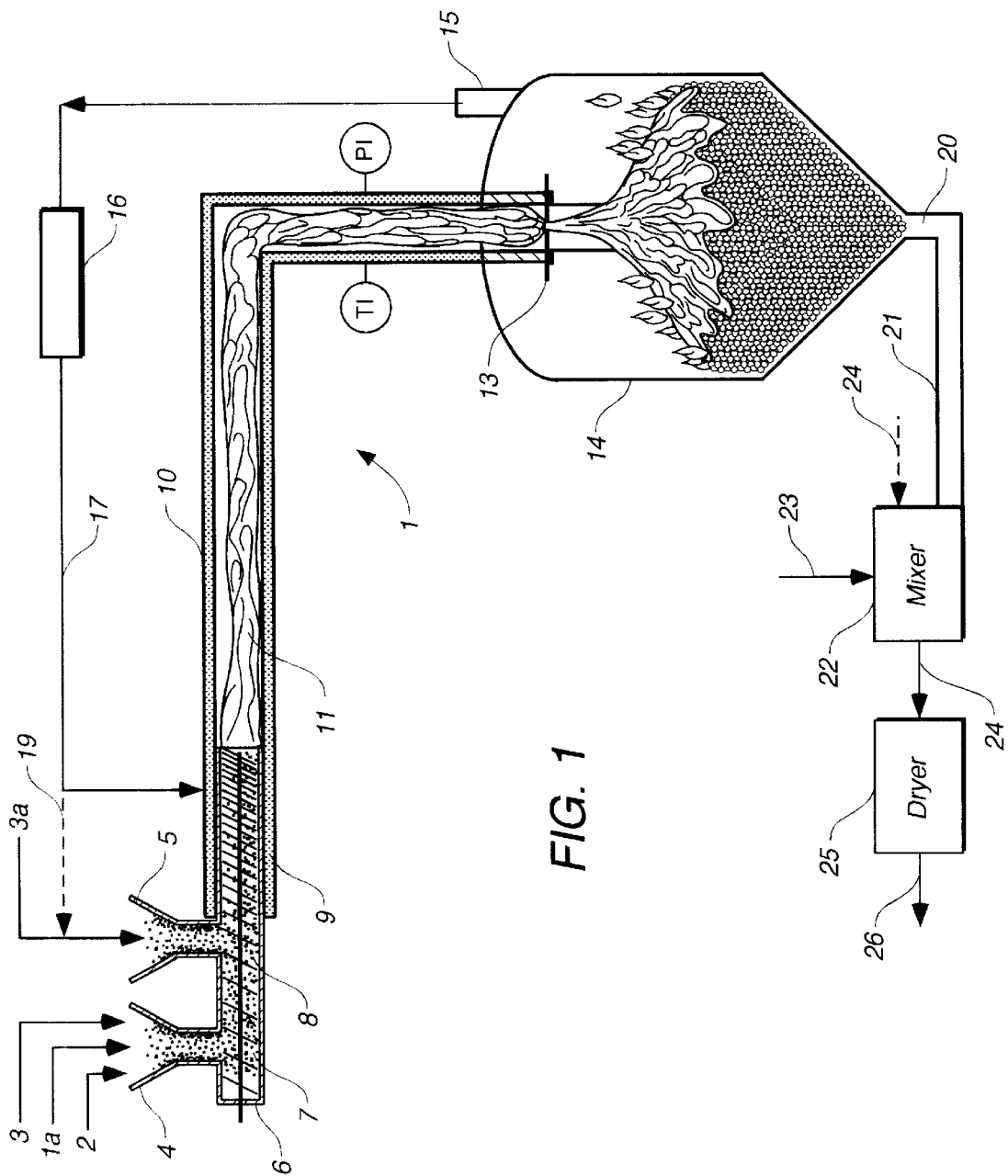
FIG. 1 is a flow diagram showing the process of the present invention in accordance with the preferred embodiment of the present invention.

FIG. 1 is an illustration of the BIOSET (TM) process 1 as used with the coal fines. In the BIOSET (TM) process 1, the dewatered sludge is delivered for processing so as to produce a pathogen-free and vector-free end product. In the BIOSET (TM) process 1, the sludge 1a, an acid 2, and an oxide-containing chemical 3 are delivered together into a feed hopper 4. The dewatered sludge 1a will have a solids content of greater than 7 percent or a water content of less than 93 percent. It is important for the sludge 1a to have a water content such that the remaining chemicals introduced to the process can properly react with the sludge.

Within the present invention, the preferred acid 2 is sulfamic acid. Sulfamic acid is otherwise known as amidosulfonic acid ($H_3NO_3S$). Sulfamic acid is obtained from chlorosulfonic acid and ammonia or by treating urea with $H_2SO_4$. Typically, sulfamic acid is otherwise used in acid cleaning, in nitrite removal, and in chlorine stabilization for use in swimming pools, cooling towers, and paper mills.

Importantly, within the concept of the present invention, the acid 2 which is used is not limited to sulfamic acid. Various other acids could possibly be used provided a suitable amount of heat could be imparted to the sludge as it passes a later point in the process of the present invention. For example, carbon dioxide could be substituted for the sulfamic acid. The carbon dioxide would form carbonic acid when reacted with the waste sludge. Although experiments have shown that such carbonic acid would not optimally work in the process of the present invention, it would be possible to use such carbonic acid, or other acids, so as to accomplish the purposes of the present invention.

After the sludge 1a, the acid 2 and the oxide-containing chemical 3 are added together into the feed hopper 4, the mixture is auger fed into the feed section 7 of a screw conveyor 6. The screw conveyor 6 will rotate so as to transport the mixture of the sludge 1a, the acid 2 and the oxide-containing chemical 3 to a feed section. During the transport of the mixture, the sludge 1a, the acid 2 and the oxide-containing chemical 3 are mixed together by the screw conveyor 6.

As used in the present invention, the oxide-containing chemical 3 could be either calcium hydroxide, sodium hydroxide, potassium hydroxide, lithium hydroxide, calcium oxide, sodium oxide, potassium oxide and lithium oxide. In the preferred embodiment of the present invention, the oxide-containing chemical 3 could be either calcium hydroxide or calcium oxide. Other ingredients 3a can be added to the feed section 8, if desired. These other ingredients could be passed along with the oxide-containing chemical 3 or otherwise delivered into the feed section 8. These materials are then transported to the compression zone in the reaction chamber 9 of the screw conveyor 6. This compression zone in the reaction chamber 9 serves to increase the pressure of the mixed sludge to the desired value. Specifically, the compression zone in the reaction chamber 9 should increase the pressure of the mixed sludge to a pressure of greater than 14.7 p.s.i.a. Experimentation has found that the desired effects of the present invention are achieved by pressurizing the mixed sludge to a pressure of between 14.7 p.s.i.a. and 120 p.s.i.a. Importantly, the preferred pressure is greater than 20.7 p.s.i.a. At such pressures, water is retained in the mixture and is not flashed from the system. When the water is flashed by pressures of less than 20.7 p.s.i.a., there is a loss of heat of approximately 1,000 BTU per pound of water. As such, to preserve the optimal heating effects in the process of the present invention, it would be desirable to maintain the pressure on the mixture to a level which would prevent the flashing of the water. Furthermore, the higher pressure keeps any ammonia ($NH_3$) from flashing and retains the ammonia for intimate mixing with the pathogens of the waste sludge. The ammonia byproduct produced from the process of the present invention is an effective chemical for the killing of pathogens in the sludge.

The adding of the oxide-containing chemical 3 and the increasing of pressure through the motive force of the screw conveyor 6 causes an exothermic reaction along the reaction chamber 9. The combination of calcium oxide and the water within the waste sludge produces calcium hydroxide and liberates 235 kcal/mole of heat. This raises the temperature from ambient to 100° C. in 0.5 seconds. The sulfamic acid 2 then reacts with the calcium hydroxide to form calcium salts. This raises the temperature from 100° C. to 140° C. in less than 1 second.

In the present invention, the oxide-containing chemical 3 can be produced from any source, such as kiln dust or lime dust. The oxide-containing chemical 3 will make up between 5 percent and 50 percent of the waste sludge 1a by weight. The acid 2 that is added, in any form, whereby the weight ratio of acid 2 to the oxide-containing chemical 3 is between 0.33:1 and 1:1. In general, the temperature of the reaction chamber 9 will be between 50° C. and 450° C.

The material which exits the screw conveyor 6 enters pipe 11 having insulation 10 extending therearound. This pipe 11 can contain static mixing elements. The material is continuously mixed as it progresses through the predetermined length of the pipe. The material is continuously under pressure within the pipe 11 so as to prevent a premature flashing of the water within the mixed sludge. The mixed sludge will pass as a flow through the length of the pipe 11. The pipe 11 should be sized so as to have a length and diameter such that the flow of the mixed sludge will continue through the pipe 11 for a period of no less than 15 seconds. The intimate mixing of the ammonia with the pathogens of the mixed sludge at such an elevated temperature and under such an elevated pressure will effectively destroy any pathogens or vectors which would occur within the mixed sludge. The intimate contact of the sludge with the ammonia provides strong disinfecting action to the waste sludge. The pressure within the pipe 11 will prevent the ammonia from flashing. Experiments with the present invention have shown that it will reduce pathogens from 2.2 million colonies per gram to less than 10 colonies per gram.

After reacting within the pipe 11, the mixed sludge is flashed across a restricting orifice 13. This restricting orifice 13 can be an opening, a die, or a valve. The orifice 13 is positioned generally adjacent to the end of the pipe 11. The orifice 13 will communicate with a flash chamber 14. As such, the material is delivered under pressure to the orifice 13 and then released into the flash chamber 14. A vapor, including water vapor, $NH_3$, $SO_2$, and $SO_3$, will exit the flash chamber 14 through the vent 15. This vapor can then pass to a container 16. The products of the process can then be sold as valuable byproducts external of the system. Alternatively, the products of the process can be passed along line 17 so as to be recycled (as a component or as a heat exchange fluid to the reaction chamber 9). The products can be introduced as a component 19 of the other ingredients 3a into second feed hopper 5.

In order to properly remove the water from the sludge, it is important that the flash chamber 14 has an interior pressure of between 0 and 14.7 p.s.i.a. As such, when the mixed sludge passes through the orifice 13, the sludge will be exposed to a lesser pressure. This causes the water and other volatile components of the sludge to be evaporated. As a result, the water content and the temperature of the sludge are appropriately reduced. The heat of vaporization of the flashed material can be passed directly back to the sludge by using heat exchangers, pumps or vapor compressors. After the sludge passes into the flash chamber 14, the resulting sludge will be a sterile decontaminated product which is pathogen-free and vector-free. This product will meet or exceed U.S. E.P.A. standards.

The sterilized sludge then exits the flash chamber 14 through the discharge opening 20.

The geometric configuration of the flash chamber 14 is dependent upon the layout configuration of the facility in which it is used. The flash chamber 14 should have a sufficient diameter and length so as to provide a residence time of the sludge within the chamber of greater than 15 seconds. The insulation 10 is provided so as to eliminate heat loss and to produce an adiabatic reaction.

Tests have been conducted with the configuration of the present invention. The experimental data associated with the process of the present invention is identified in Table I hereinbelow. During these experiments, oxalic acid was included in the experiments. However, it was later determined that the oxalic acid is a temperature depressor and can be a poison. As such, oxalic acid should not be included as part of the process of the present invention. Other test results have shown that acids such as $HNO_3$ acid, acetic acid, and vinegar acid do not achieve the necessary reaction so as to significantly increase the temperature of the waste sludge.

TABLE I

| EXP # | CaO gr. | OXALIC ACID gr. | SULFA- MIC ACID gr. | WATER cc. | TEMP F. | TIME TO REACH TEMP mins. |
|---|---|---|---|---|---|---|
| 1 | 189 | 75 | 58 | 24 | 300 | 8 |
| 2 | 189 | 75 | 112 | 24 | 807 | 8 |
| 3 | 337 | 150 | 224 | 24 | 818 | 8 |
| 4 | 337 | 308 | 112 | 24 | 580 | 4 |
| 5 | 189 | 75 | 168 | 24 | 400 | 1 |
| 6 | 189 | 75 | 112 | 24 | 887 | 5 |
| 7 | 50 | 40 | 87 | 24 | 250 | 1 |
| 8 | 189 | 0 | 130 | 24 | 840 | 1 |
| 9 | 189 | 130 | 0 | 24 | 370 | 1 |
| 10 | 159 | 0 | 0 | 12 | 213 | 0.2 |
| 11 | 0 | 75 | 0 | 12 | 0 | 1 |
| 12 | 0 | 0 | 38 | 12 | 0 | 1 |
| 13 | 189 | 130 | 0 | 24 | 500 | 3 |
| 14 | 189 | 0 | 130 | 24 | 820 | 1 |
| 15 | 85 | 0 | 85 | 24 | 700 | 1 |
| 16 | 189 | 0 | 130 | 24 | 750 | 1 |
| 17 | 189 | 0 | 130 | 72 | 750 | 1 |
| 18 | 189 | 0 | 188 | 24 | 800 | 1 |

The end product exiting the flash chamber 14 will then be passed along pipe 21 into a mixer 22. The mixer 22 is suitably connected to an input line 23 so as to receive coal fines therein. The mixer 22 will serve to intimately mix the treated sewage sludge passing from the flash chamber 14 through discharge opening 20 and conduit 21 with the coal fines.

It is important to note that the treated sewage sludge passing into the mixer 22 will include calcium hydroxide, alum (clay), silicates (sand) and organic matter. The combination of the calcium hydroxide, alum and sand will create a pozzolanic reaction. Additionally, the treated sewage sludge will include suitable surfactants so as to allow any inorganic matter to be secured as part of the pozzolanic reaction. The organic matter within the treated sewage sludge will have a BTU content of approximately 1200 BTU per pound. The calcium hydroxide will comprise between 20 and 60% by weight of the treated sewage sludge. The sand (silicates) will be between 1 and 20% by weight of the treated sewage sludge.

In the mixer 22, it is preferred that the mixture of coal fines and sewage sludge should be approximately 60% by weight of coal fines with 40% by weight of sewage sludge. However, on tests conducted with the present invention, up to 95% of coal fines can be mixed with 5% of sewage sludge. As the proportion of coal fines increases, the tensile strength of the resulting end product will decrease. As such, if a large proportion of coal fines is used, then it may be necessary to introduce a binder material through line 24 into the mixing chamber 22. This binder material can be a water-soluble polymer, such as polyvinyl alcohol. Alternatively, the binder material can be molasses, wax or paraffin. Whether a binder material is used or not will be a direct function of the cost of the end product. The mixing chamber 22 can be an open mixing chamber, a pug mill or any other form of mixer. The mixture of the treated sewage sludge and the coal fines in mixer 22 will pass along line 24 to a dryer 25. The dryer 25 will when serve to pelletize the mixture of the treated sewage sludge and coal fines. In the preferred form of the present invention, the mixture of the coal fines and treated sewage sludge will be pelletized to $\frac{1}{16}$th inch in diameter to $\frac{5}{8}$ inch in diameter. However, within the scope of the present invention, the dryer 25 can produce an end product of various forms. For example, the dryer 25 can produce the end product in the form of logs, briquets or other items. The pelletized mixture can then pass through line 26 outwardly of the dryer 25 for transportation and/or storage.

On tests conducted with the process of the present invention, with the coal fines being 60% and sewage sludge being 40% of the total mixture, the end product will have a heat of combustion of 6,950 BTU per pound. Since the BTU per pound is in excess of 5,000 BTU per pound, the end product of the process for the present invention can be eligible for the alternative fuel tax credit. Additionally, such a BTU content (the combination of the BTU content of the organic matter of the sewage sludge and the BTU content of the coal fines) will allow the end product to be suitably burned in a coal-fired plant or in a combustion chamber. As such, the sewage sludge can be disposed of by burning and the coal fines can be disposed of by burning in the form of a valuable fuel product. The present invention accomplishes the purpose of disposal and of producing a valuable and sellable fuel product simultaneously. The pelletizing process allows the coal fines to be easily transported and stored without the production of coal dust or other unwelcome byproducts.

Tests conducted with the end product of the process of the present invention shows an ash content, as analyzed in accordance with ASTM Method D-240, of 42.3% of w/w. The sulfur content by the bomb method (ASTM Method D-129) is 0.054 weight percent. These tests were conducted on 1 pound, 5 ounces of wet coal fines (with 38% moisture) combined with 1.0 pound of the treated sewage sludge (with 70% moisture).

The foregoing disclosure and description of the invention is illustrative and explanatory thereof. Various changes in the details of the steps of the method of the present invention can be made within the scope of the present invention without departing from the true spirit of the invention. The present invention should only be limited by the following claims and their legal equivalents.

We claim:

1. A process for making a fuel product comprising:
    blending a sewage sludge with a sulfamic acid, said sewage sludge having a solids content of greater than 7% by weight;
    mixing an oxide-containing chemical with the blended sludge so as to cause a reaction which elevates a temperature of the sludge, said oxide-containing chemical selected from the group consisting of calcium oxide and calcium hydroxide;
    pressurizing the mixed sludge to a pressure of greater than 14.7 p.s.i.a. for a period of time of no less than 15 seconds;
    passing the pressurized mixed sludge through a flash chamber;
    mixing the pressurized mixed sludge with coal fines subsequent to the step of passing the pressurized mixed sludge through the flash chamber; and
    solidifying the mixture of pressurized mixed sludge and coal fines such that the solified mixture has between 40% and 95% inclusive by weight of coal fines.

2. The process of claim 1, said pressurized mixed sludge having a calcium hydroxide content of between 20 and 60% inclusive by dry weight.

3. The process of claim 1, said pressurized mixed sludge having a silicate content of between 1 and 20% inclusive by weight.

4. The process of claim 1, said step of solidifying comprising:
    pelletizing the mixtures of pressurized mixed sludge and coal fines.

5. The process of claim 1, further comprising:
    dewatering the sludge prior to the step of blending, said dewatering causing the sludge to have a water content of less than 93% by weight.

6. The process of claim 1, said step of pressurizing comprising:
    passing the mixed sludge as a flow through a pipe, said pipe maintaining the mixed sludge at a pressure of greater than 14.7 p.s.i.a., said pipe having a length such that the flow of the mixed sludge takes longer than 15 seconds to pass through said pipe.

7. A process for making a fuel product comprising:
    blending a sewage sludge with a sulfamic acid;
    mixing calcium hydroxide with the blended sludge so as to cause a reaction which elevates a temperature of the blended sewage sludge;
    pressurizing the mixed sludge to a pressure of greater than 14.7 p.s.i.a. for a period of time of no less than 15 seconds;
    passing the pressurized mixed sludge through a flash chamber;
    mixing coal fines with the pressurized mixed sludge, said pressurized mixed sludge containing calcium hydroxide, aluminum and silicates, said step of blending and of mixing and of pressurizing and of passing occurring prior to the step of mixing the coal fines with the sewage sludge; and
    solidifying the mixture of coal fines and the pressurized mixed sludge such that the solidified mixture has between 40% and 95% by weight of coal fines.

8. The process of claim 7, said calcium hydroxide being between 20 and 60% by weight inclusive of said sewage sludge, said silicates being between 1 and 20% inclusive by weight of said sewage sludge.

9. The process of claim 7, further comprising:
    adding a binder material to the mixture of coal fines and sewage sludge prior to the step of solidifying.

10. The process of claim 9, said binder material selected from the group consisting of a water soluble polymer, wax, paraffin and molasses.

11. The process of claim 7, further comprising:
    dewatering the sludge prior to the step of blending, said dewatering causing the sludge to have a water content of less than 93% by weight.

12. The process of claim 7, said step of solidifying comprising:
    pelletizing the mixture of coal fines and sewage sludge so as to have a BTU content of no less than 5000 BTU per pound.

13. A process for making a fuel product comprising:
    blending a sewage sludge with a sulfamic acid;
    mixing an oxide-containing chemical with the blended sewage sludge so as to cause a reaction which elevates a temperature of the sludge, said oxide-containing chemical selected from the group consisting of calcium oxide and calcium hydroxide;
    pressurizing the mixed sludge to a pressure of greater than 14.7 p.s.i. for a period of time of no less than 15 seconds;
    passing the pressurized mixed sludge through a flash chamber;
    mixing the pressurized mixed sludge with coal fines subsequent to the step of passing; and solidifying the mixture of pressurized mixed sludge and coal fines such that the solidified mixture has between 40% and 95% inclusive by weight of coal fines.

14. The process of claim 13, said oxide-containing chemical being between 20 and 60% by weight inclusive of the pressurized mixed sludge, said pressurized mixed sludge having a silicate content of between 1 and 20% by weight inclusive.

\* \* \* \* \*